US006777056B1

(12) United States Patent
Boggs et al.

(10) Patent No.: US 6,777,056 B1
(45) Date of Patent: Aug. 17, 2004

(54) REGIONALLY DISTINCT NONWOVEN WEBS

(75) Inventors: Lavada Campbell Boggs, Marietta, GA (US); Kevin George Hetzler, Sparta, NJ (US); Glen Thomas Mildenhall, Marietta, GA (US); Michael Tod Morman, Alpharetta, GA (US); Dan Kenneth Schiffer, Marietta, GA (US); Susan Elaine Shawver, Roswell, GA (US); Sandy Chi-Ching Tan, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 222 days.

(21) Appl. No.: 09/689,048

(22) Filed: Oct. 12, 2000

Related U.S. Application Data

(60) Provisional application No. 60/159,242, filed on Oct. 13, 1999.

(51) Int. Cl.⁷ ................................................ B32B 3/26
(52) U.S. Cl. ................... 428/58; 442/389; 442/381; 442/387; 442/415; 442/329; 442/333; 442/334; 442/335; 442/392
(58) Field of Search ............................ 428/58; 442/392, 442/384, 381, 387, 415, 329, 333, 334, 335

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,855,046 A | 12/1974 | Hansen et al. | |
| 3,949,128 A | 4/1976 | Ostermeier | |
| 3,973,068 A | 8/1976 | Weber | |
| 4,041,203 A | 8/1977 | Brock et al. | |
| 4,070,218 A | 1/1978 | Weber | |
| 4,340,563 A | 7/1982 | Appel et al. | |
| 4,374,888 A | 2/1983 | Bornslaeger | |

(List continued on next page.)

FOREIGN PATENT DOCUMENTS

| | | |
|---|---|---|
| EP | 0 400 333 B1 | 4/1990 |
| EP | 0 413 688 B1 | 6/1994 |
| EP | 0 475 307 B1 | 11/1995 |
| EP | 0 475 306 B1 | 3/1997 |
| EP | 0 586 924 B1 | 10/1997 |
| WO | WO 97/49848 | 12/1997 |

OTHER PUBLICATIONS

G. Coates and R. Waymouth, "Oscillating Stereocontrol: A Strategy for the Synthesis of Thermoplastic Elastomeric Polypropylene" 267 Science 217–219 (Jan. 1995).
K. Wagener, "Oscillating Catalysis: A New Twist for Plastics" 267 Science 191 (Jan. 1995).

*Primary Examiner*—William P. Watkins, III
(74) *Attorney, Agent, or Firm*—Douglas H. Tulley; William W. Letson; Christos S. Kyriakou

(57) ABSTRACT

Composite nonwoven webs are provided having two distinct regions extending adjacent one another in the machine direction of the web; the first region is formed from first continuous filaments and the second region is formed from second continuous filaments. The interface of the first and second region is formed from a mixture the first and second continuous filaments in a confluent relationship with one another and such that the two distinct regions form a unitary nonwoven web. The respective first and second regions can have distinct physical attributes as a result of utilizing first and second filaments which are different from one another. The first and second continuous filaments can vary with respect to average fiber denier, cross-sectional shape, cross-sectional configuration, polymer composition, crimp level, and additive composition.

27 Claims, 1 Drawing Sheet

U.S. PATENT DOCUMENTS

| | | | |
|---|---|---|---|
| 4,526,733 A | | 7/1985 | Lau |
| 4,663,220 A | | 5/1987 | Wisneski et al. |
| 4,675,471 A | * | 6/1987 | Shida et al. .................. 174/36 |
| 4,707,398 A | | 11/1987 | Boggs |
| 4,720,415 A | | 1/1988 | Vander Wielen et al. |
| 4,767,586 A | | 8/1988 | Radwanski et al. |
| 4,795,668 A | | 1/1989 | Krueger et al. |
| 4,803,117 A | | 2/1989 | Daponte |
| 4,833,003 A | | 5/1989 | Win et al. |
| 4,853,281 A | | 8/1989 | Win et al. |
| 4,921,659 A | * | 5/1990 | Marshall et al. ............ 264/510 |
| 4,965,122 A | | 10/1990 | Morman |
| 5,057,368 A | | 10/1991 | Largman et al. |
| 5,069,970 A | | 12/1991 | Largman et al. |
| 5,108,820 A | | 4/1992 | Kaneko et al. |
| 5,160,746 A | | 11/1992 | Dodge, II et al. |
| 5,178,931 A | * | 1/1993 | Perkins et al. .............. 428/198 |
| 5,188,885 A | | 2/1993 | Timmons et al. |
| 5,204,429 A | | 4/1993 | Kaminsky et al. |
| 5,208,304 A | | 5/1993 | Waymouth |
| 5,212,246 A | | 5/1993 | Ogale |
| 5,271,883 A | | 12/1993 | Timmons et al. |
| 5,272,236 A | | 12/1993 | Lai et al. |
| 5,277,976 A | | 1/1994 | Hogle et al. |
| 5,278,272 A | | 1/1994 | Lai et al. |
| 5,300,365 A | | 4/1994 | Ogale |
| 5,331,047 A | | 7/1994 | Giacobbe |
| 5,332,613 A | | 7/1994 | Taylor et al. |
| 5,336,545 A | | 8/1994 | Morman |
| 5,344,297 A | | 9/1994 | Hills |
| 5,349,734 A | | 9/1994 | Poulsen et al. |
| 5,366,793 A | | 11/1994 | Fitts, Jr. et al. |
| 5,382,400 A | | 1/1995 | Pike et al. |
| 5,385,775 A | | 1/1995 | Wright |
| 5,413,849 A | * | 5/1995 | Austin et al. .................. 28/104 |
| 5,451,450 A | | 9/1995 | Erderly et al. |
| 5,466,410 A | | 11/1995 | Hills |
| 5,472,775 A | | 12/1995 | Obijeski et al. |
| 5,486,166 A | | 1/1996 | Bishop et al. |
| 5,534,339 A | | 7/1996 | Stokes |
| 5,539,124 A | | 7/1996 | Etherton et al. |
| 5,540,976 A | | 7/1996 | Shawver et al. |
| 5,549,080 A | | 8/1996 | Uchikawa |
| 5,554,775 A | | 9/1996 | Krishnamurti et al. |
| 5,562,650 A | | 10/1996 | Everett et al. |
| 5,620,779 A | | 4/1997 | Levy et al. |
| 5,639,541 A | | 6/1997 | Adam |
| 5,652,048 A | | 7/1997 | Haynes et al. |
| 5,679,042 A | | 10/1997 | Varona |
| 5,691,035 A | | 11/1997 | Chappell et al. |
| 5,695,868 A | | 12/1997 | McCormack |
| 5,696,191 A | | 12/1997 | Nohr et al. |
| 5,704,930 A | | 1/1998 | Lavash et al. |
| 5,707,735 A | | 1/1998 | Midkiff et al. |
| 5,714,107 A | | 2/1998 | Levy et al. |
| 5,721,180 A | | 2/1998 | Pike et al. |
| 5,759,926 A | | 6/1998 | Pike et al. |
| 5,811,178 A | | 9/1998 | Adam et al. |
| 5,817,584 A | | 10/1998 | Singer et al. |
| 5,853,635 A | | 12/1998 | Morell et al. |
| 6,053,719 A | | 4/2000 | Barbier et al. |
| 6,057,024 A | * | 5/2000 | Mleziva et al. .............. 156/161 |
| 6,245,401 B1 | * | 6/2001 | Ying et al. .................. 428/212 |

* cited by examiner

REGIONALLY DISTINCT NONWOVEN WEBS

CROSS-REFERENCE TO RELATED APPLICATIONS

This application claims the benefit of U.S. Provisional Application No. 60/159,242 filed Oct. 13, 1999.

FIELD OF THE INVENTION

The present invention relates to continuous filament nonwoven webs.

BACKGROUND OF THE INVENTION

There exist a variety of processes for forming continuous filament nonwoven webs. The spunbond fiber process is one example. Generally speaking, methods for making spunbond fiber nonwoven webs include extruding molten thermoplastic polymer through a spinneret and drawing the extruded polymer into filaments to form a web of randomly arrayed fibers on a collecting surface. As examples, methods for making the same are described in U.S. Pat. No. 4,692,618 to Dorschner et al., U.S. Pat. No. 4,340,563 to Appel et al. and U.S. Pat. No. 3,802,817 to Matsuki et al. A second and distinct process for making continuous filament nonwoven webs is the meltblowing process. Meltblown fiber webs are generally formed by extruding a molten thermoplastic material through a plurality of fine die capillaries as molten threads or filaments into converging high velocity air streams which attenuate the filaments of molten thermoplastic material to reduce their diameter. Thereafter, the meltblown fibers are deposited on a collecting surface to form a web of randomly dispersed meltblown fibers. Meltblown fiber processes are disclosed in, by way of example only, U.S. Pat. No. 3,849,241 to Butin et al., U.S. Pat. No. 5,160,746 to Dodge et al., and U.S. Pat. No. 4,526,733 to Lau.

Continuous filament nonwoven webs have found industrial applicability in a wide range of products and/or uses. As examples, continuous filament nonwoven webs have heretofore been used as filtration and/or barrier type materials such as in facemasks, sterilization wraps, HVAC media, surgical gowns, industrial workwear and so forth. Additionally, continuous filament nonwoven webs have been widely used as one or more components of personal care products. As examples, continuous filament nonwoven webs have been used in a variety of components ranging from liquid distribution layers, composite absorbent materials, baffles, coverstock and so forth. However, while continuous filament nonwovens have found wide acceptance within various industries the demands upon the physical attributes and/or performance of existing materials continues to increase. In addition, by improving the physical attributes and/or performance of continuous filament nonwoven materials the materials can be utilized in still a wider array of applications and products.

Thus, there exists a need for continuous filament nonwoven webs having improved and/or specialized physical attributes and functionality. More particularly, there exists a need for specialized continuous filament nonwoven webs having improved liquid handling properties, treatment retention and location, hand (i.e. softness), resiliency, durability, stretch-recovery and/or other desirable properties.

SUMMARY OF THE INVENTION

The aforesaid needs are fulfilled and the problems experienced by those skilled in the art overcome by nonwoven webs of the present invention comprising a unitary continuous filament nonwoven web comprising a composite of at least first and second continuous filaments. In one aspect of the present invention, the continuous filament nonwoven web can comprise a first region comprising first filaments and a second region comprising second filaments wherein the first and second filaments are different from one another. The first and second regions can extend adjacent one another in the machine direction. Further, the first and second filaments can be entangled or mixed adjacent the inter-face between the first and second region. In a further aspect of the invention, the composite nonwoven web can comprise a region of first continuous filaments, a region of second continuous filaments and a region of third continuous filaments each extending substantially continuously in the machine direction. The second region can thus be a discrete region positioned between the first and third regions. The second continuous filaments are distinct from the first and third continuous filaments and the first and third filaments can be the same or different from one another.

DEFINITIONS

Figure 1:
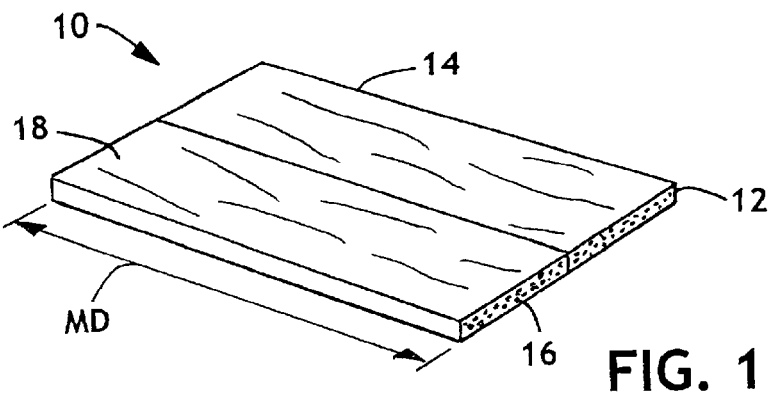
FIG. 1 is a partially elevated view of a composite nonwoven web having a first region of first fibers and a second region of second fibers.

As used herein and in the claims, the term "comprising" is inclusive or open-ended and does not exclude additional unrecited elements, compositional components, or method steps.

As used herein the term "nonwoven" fabric or web means a web having a structure of individual fibers or threads which are interlaid, but not in an identifiable manner as in a knitted or woven fabric. Nonwoven fabrics or webs can be formed by various processes including, but not limited to, meltblowing processes and spunbonding processes.

As used herein the term "spunbond fibers" refers to small diameter fibers of mechanically and/or eductively drawn polymeric material. Spunbond fibers are generally formed by extruding molten thermoplastic material as filaments from a plurality of fine capillaries of a spinneret with the diameter of the extruded filaments then being rapidly reduced. Examples of spunbond fibers and methods of making the same are described in, by way of example only, U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, U.S. Pat. No. 5,382,400 to Pike et al., U.S. Pat. No. 5,795,926 to Pike et al.; the entire content of the aforesaid patents are incorporated herein by reference. Spunbond fibers are generally not tacky when they are deposited onto a collecting surface and are continuous.

As used herein the term "meltblown fibers" means fibers of polymeric material which are generally formed by extruding a molten thermoplastic material through a plurality of die capillaries as molten threads or filaments into converging high velocity air streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Meltblowing process are disclosed in, by way of example only, in U.S. Pat. No. 3,849,241 to Butin et al. and U.S. Pat. No. 5,271,883 to Timmons et al., U.S. Pat. No. 5,160,746 to Dodge et al., U.S. Pat. No. 4,526,733 to Lau, U.S. Pat. No. 5,652,048 to Haynes et al., and U.S. Pat. No. 5,366,793 to Fitts et al.; the entire contents of the aforesaid references are incorporated herein by reference. Meltblown fibers are generally smaller than about 10 microns in average diameter and, unlike spunbond fibers, are generally tacky when deposited onto a collecting surface, thereby bonding to one another during the deposition step.

As used herein, "ultrasonic bonding" means a process performed, for example, by passing the fabric between a sonic horn and anvil roll as illustrated in U.S. Pat. No. 4,374,888 to Bornslaeger.

As used herein "point bonding" means bonding one or more layers of fabric at numerous small, discrete bond points. As an example, thermal point bonding generally involves passing one or more layers to be bonded between heated rolls such as, for example, an engraved patterned roll and a second roll. The engraved roll is patterned in some way so that the entire fabric is not bonded over its entire surface, and the second roll can be flat or patterned. As a result, various patterns for engraved rolls have been developed for functional as well as aesthetic reasons. One example of a pattern has diamond shaped points and is the Hansen Pennings or "H&P" pattern with about a 30% bond area and with about 200 bonds/square inch as taught in U.S. Pat. No. 3,855,046 to Hansen et al.

As used herein, the term "autogenous bonding" refers to bonding between discrete parts and/or surfaces independently of mechanical fasteners or external additives such as adhesives, solders, and the like.

As used herein the term "wetting agent" refers to any chemical compound or composition that makes a fiber surface exhibit increased hydrophilic characteristics such as by lowering the contact angle of an aqueous fluid that comes in contact with the fiber surface.

DESCRIPTION OF THE INVENTION

In reference to FIG. 1, a nonwoven web 10 of continuous filaments can be provided wherein first filaments 12 are substantially located in first region 14 and second filaments 16 and substantially located in second region 18. First and second filaments 12, 14 are different from one another and can vary in numerous respects. By way of example only, the first and second filaments can vary with respect to average fiber size or denier, cross-sectional shape (e.g. round, crescent, multi-lobal, flat, etc.), cross-sectional configuration (e.g. monocomponent, multicomponent or multiconstituent), polymer composition, crimp level, addition or level of internal treatments or additives and so forth. First region 14 and second region 18, as well as the filaments forming the same, extend adjacent one another in the machine direction (MD). As used herein, the term "machine direction" or MD means the direction of the fabric in the direction in which it is produced. The term "cross machine direction" or CD means the direction of the fabric substantially perpendicular to the MD. The percent area (percent of the total area of the composite nonwoven web) of the first region and/or second region desirably ranges between about 98% to about 2% and more desirably between about 75% to about 25%. The nonwoven web is a single, continuous integrated structure wherein the distinct regions are attached to one another by the confluent or entangled relationship of the first and second continuous filaments proximate the areas where the first and second segments abut one another.

As one example, the first continuous filaments can comprise filaments having a smaller denier than the second continuous filaments. Desirably, the second continuous filaments have an average diameter at least about 5 micrometers larger than that of the first continuous filaments and still more desirably have an average diameter at least about 15 micrometers larger than that of the first continuous filaments. In one aspect, the first continuous filaments can have an average diameter of between about 0.1 and about 20 micrometers and the second continuous filaments have an average diameter between about 25 and about 150 micrometers. One or more of various methods can be used to achieve distinct fiber diameters. First, distinct fiber diameters can be achieved by employing different sized exit orifices or outlet openings in the spin plate or die body. Further, distinct fiber sizes can also be achieved using polymers in the first and second filaments that have significantly different melt-flow rates. In yet a further embodiment, the first or smaller diameter fibers can be solid fibers and the second or larger fibers can be hollow fibers. Hollow fibers can be made by various methods known in the art such as, for example, by using a plurality of arced exit slots whereby swelling of the polymer after extrusion causes the molten polymer to form a fiber having a hollow center.

In a further aspect, the first filaments can comprise a different shape than those of the second region. As an example, the fibers of the first region can comprise round fibers and those of the second region can comprise a distinct cross-sectional shape such as, for example, a crescent shape, multilobal shape, ribbon shape as well as other geometric and/or non-geometric shapes. The regional variation in fiber size and/or shape can be achieved by employing a spinneret, die or spin plate having distinct outlet openings for the first and second continuous filaments. The respective outlet openings can have the shape necessary to achieve the desired cross-sectional shape and methods of extruding fibers having various shapes are known in the art such as, for example, those as described in U.S. Pat. No. 5,707,735 to Midkiff et al., U.S. Pat. No. 5,277,976 to Hogle et al., U.S. Pat. No. 5,466,410 to Hills, U.S. Pat. No. 5,069,970 and U.S. Pat. No. 5,057,368 to Largman et al. Further, when using multicomponent filaments, varied and distinct fiber shaped can be achieved by splitting one or both of the first and second continuous filaments.

In a further aspect, the first and second filaments can comprise different polymer compositions. By providing filaments comprising distinct polymers it is possible to achieve a nonwoven web having regionally distinct properties whereby the first and second regions can have distinct tensile strengths, durability, elasticity, wettability, absorbency, three-dimensional web structure, porosity, density and/or other characteristics. The first and second filaments can be selected from thermoplastic polymers including, but not limited to, polyolefins (e.g., polypropylene and polyethylene), polycondensates (e.g., polyamides, polyesters, polycarbonates, and polyarylates), polyols, polydienes, polybutylenes, polyurethanes, polyethers, polyacrylates, polyacetals, polyimides, cellulose esters, polystyrenes, fluoropolymers and so forth. The particular polymer composition of the first and second filaments can be selected to achieve the desired physical attributes of the respective regions as well as that of the composite nonwoven web.

As an example, the first filaments can comprise an extensible filament of a first polymer and the second filaments can comprise an elastic filament of a second polymer having superior elastic recovery properties (relative to that of the first polymer). Suitable elastic filaments can comprise, by way of example only, elastic polyesters, polyurethanes, polystyrenes, polyolefins and so forth. Exemplary thermoplastic elastomers and/or elastomeric fibers suitable for use with the present invention include, but are not limited to, those described in U.S. Pat. Nos. 5,332,613 to Taylor et al.; 4,803,117 to Daponte; 4,707,398 to Boggs et al.; 4,663,220 to Wisneski et al.; U.S. Pat. Nos. 5,278,272 and 5,272,236 to Lai et al.; U.S. Pat. No. 5,472,775 to Obijeski et al.; U.S. Pat. No. 5,331,047 to Giacobbe et al.; and EP Patent No. 0400333B1. As one example, the first continuous filaments, comprising the first region, can comprise a polyolefin elastomer and the second continuous filaments, comprising the second region, can comprise a blend of a polyolefin and a polymer having improved elastic recovery properties such as, for example, KRATON polymer available from the Shell Chemical Company. KRATON polymers comprise block copolymer having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer.

As a further example, the first filaments can comprise a first polyolefin and the second filaments can comprise a second polyolefin. In this regard, the first filaments of the first region can comprise polypropylene and the second filaments of the second region can comprise a distinct blend or copolymer such as propylene-ethylene copolymers, propylene-butylene copolymers, KRATON/polypropylene blends and so forth. In addition, it is noted that there exist a wide variety of polymers having distinct characteristics and yet which comprise substantially similar and/or identical repeat units. For example, two polymers can each comprise substantial amounts of propylene and yet comprise different polymers for purposes of the present invention. Polymers having identical monomers or repeat units and distinct physical properties (e.g. melt-flow rates, polydispersity numbers, modulus of elasticity, melt-flow rates and so forth) can be achieved through the use of different synthesis steps and/or catalysts. Polyolefin polymers having varied physical attributes are described in U.S. Pat. No. 5,300,365 to Ogale; U.S. Pat. No. 5,212,246 to Ogale; U.S. Pat. No. 5,331,047 to Giacobbe; U.S. Pat. No. 5,451,450 to Elderly et al.; U.S. Pat. No. 5,204,429 to Kaminsky et al.; U.S. Pat. No. 5,539,124 to Etherton et al.; U.S. Pat. Nos. 5,278,272 and 5,272,236, both to Lai et al.; U.S. Pat. No. 5,554,775 to Krishnamurti et al.; U.S. Pat. No. 5,539,124 to Etherton et al.; European Patent No. 0475307B1 and European Application No. 0475306A1. As an example, the first filaments can comprise an inelastic or crystalline polypropylene polymer and the second filaments can comprise a stereoblock polymer. The term "stereoblock polymer" refers to polymeric materials with controlled regional tacticity or stereosequencing to achieve desired polymer crystallinity. By controlling the stereoregularity during polymerization, it is possible to achieve atactic-isotactic stereo blocks. Methods of forming polyolefin stereoblock polymers are known in the art and are described in the following articles: G. Coates and R. Waymouth, "Oscillating Stereocontrol: A Strategy for the Synthesis of Thermoplastic Elastomeric Polypropylene" 267 Science 217–219 (January 1995); K. Wagener, "Oscillating Catalysts: A New Twist for Plastics" 267 Science 191 (January 1995). Stereoblock polymers and methods of their production are also described in U.S. Pat. No. 5,549,080 to Waymouth et al. and U.S. Pat. No. 5,208,304 to Waymouth. By selectively controlling the crystallinity of alpha-olefins it is possible to provide different polymers exhibiting unique tensile modulus and/or elongation properties.

In a further aspect, the first or second filaments can comprise filaments having improved (relative to the first filaments) wetting, wicking and/or absorbency characteristics in order to provide a nonwoven web having regions with distinct liquid handling properties. The improved liquid handling properties can be achieved by selecting a polymer for the first or second filaments that inherently has better wetting or absorbency characteristics than the polymer comprising the other filaments. Further, first or second filaments can be provided having improved liquid handling properties by providing the selected filaments with treatments or additives designed to impart and/or improved liquid handling properties of the resulting filaments. Thus, by the latter method, the first and second filaments can comprise the same or similar polymers and yet have distinct liquid handling properties. Numerous additives and/or treatments for imparting wettability to polyolefin fibers are known in the art. As one example, first continuous filaments can comprise polypropylene spunbond fibers and the second continuous filaments can comprise spunbond fibers comprising a blend of polypropylene and a di-fatty acid ester of polyethylene oxides, such blends are described in more detail in U.S. Pat. No. 5,349,734 to Everhart et al. As further examples, exemplary wetting agents that can be melt-processed within one of the segments in order to impart improved wettability to the fiber include, but are not limited to, ethoxylated silicone surfactants, ethoxylated hydrocarbon surfactants, ethoxylated fluorocarbon surfactants and so forth. In addition, exemplary chemistries useful in making melt-processed thermoplastic fibers more hydrophilic are described in U.S. Pat. Nos. 3,973,068 and 4,070,218 to Weber et al., and U.S. Pat. No. 5,696,191 to Nohr et al.; the entire contents of the aforesaid references are incorporated herein by reference. The second region of such a composite nonwoven web will have superior wettability and/or liquid handling properties than the first region. Thus, a composite nonwoven web can be provided having regionally distinct areas of wettability. The regions can be selectively located within the composite nonwoven web, and in an absorbent article containing the same, in order to help direct fluids through the web in a desired manner.

In a further aspect, first and second filaments can comprise filaments having or including different treatments and/or additives and which therefore result in filaments and regions with distinct physical attributes. Various fiber treatments and/or additives are known in the art and can be used to improve and/or impart desired physical attributes to filaments such as, for example, UV stability, liquid handling properties, flame-retardancy, anti-static properties, odor control properties, anti-bacterial properties and so forth. These and other treatments and/or additives can be selectively added to the first and/or second filaments such that the first and second regions have distinct physical attributes.

In a further aspect of the invention, the first filaments can comprise monocomponent fibers and the filaments of the second region can comprise multiconstituent or multicomponent filaments. Still further, the first and second filaments can each comprise multicomponent and/or multiconstituent filaments that are different from one another. The multicomponent fibers can have any one of various configurations such as, for example, side-by-side, concentric sheath/core, eccentric sheath/core, islands-in-sea and so forth. Multicomponent fibers, including bicomponent fibers, and methods of making the same are known in the art and, by way of example only, are generally described in U.S. Pat. No. 5,108,820 to Kaneko et al., U.S. Pat. No. 4,795,668 to Krueger et al., U.S. Pat. No. 5,382,400 to Pike et al., U.S. Pat. No. 5,277,976 to Hogle et al., U.S. Pat. No. 5,466,410 to Hills, U.S. Pat. No. 5,534,339 to Stokes et al., and PCT application WO97/49848 to Griesbach. In one embodiment, the filaments of the first region can comprise monocomponent polyolefin fibers and the second region can comprise multicomponent filaments wherein at least one of the components comprises a polyolefin exposed upon a portion of the outer surface of the fiber. As a particular example, the monocomponent filaments of the first region can comprise polypropylene and the multicomponent filaments of the second region can comprise side-by-side bicomponent fibers where one component comprises polypropylene such as, for example, a polyethylene/polypropylene bicomponent filament. In a further embodiment, the first filaments can comprise elastic filaments and the second filaments can comprise highly crimped multicomponent filaments whereby the composite nonwoven web exhibits good stretch and recovery properties in the MD. In this regard, the crimped filaments of one region can be extended by pulling out the crimp and the elastic filaments of the other region provide sufficient recovery properties to cause the entire web to retract after the elongating force is removed.

As a further example, the continuous filaments of the first region can comprise a first multicomponent fiber and the continuous filaments of the second region can comprise distinct multicomponent fibers. In this regard the multicomponent fibers can vary with respect to polymer composition of one or more components and/or crimp level to provide a composite nonwoven web having regions with varied densities, porosity, and/or air permeability. Notably, by varying the shape, polymers, volume percentages of respective components, and additives, the nonwoven web can be formed having both varied crimp levels and therefore varied web densities. These particular attributes can be varied to provide a nonwoven web with unique and regionally distinct fluid handling properties, air permeability and/or filtration properties. In addition, use of multicomponent fibers also allows for autogenous bonding of the web. In one aspect, the multicomponent filaments of the first region and the multicomponent filament of the second region desirably each comprise at least one polyolefin component and still more desirably each comprise a similar and/or identical polyolefin component. In a particular example, the first region can comprise polyethylene/polypropylene side-by-side filaments and the second region can comprise polyethylene/polyamide side-by-side filaments. In a further particular embodiment, the first region can comprise polyethylene/nylon side-by-side filaments and the second region can comprise polyethylene/nylon sheath/core filaments wherein the polyethylene comprises the sheath component.

The continuous filament nonwoven webs can be prepared utilizing conventional web forming processes that have been modified as described herein. As examples, both spunbond processes and meltblown processes can be used in conjunction with the present invention. Regional fibers of distinct polymer composition can be achieved by modifying conventional spin pack assemblies. Spin packs generally comprise a series of stacked plates that have a pattern of interconnecting channels and/or apertures through which multiple polymer streams can flow. The polymer streams are maintained separate as the respective polymer streams flow throughout the spin pack to the distribution plate, spinneret and/or die capillary. Examples of such spin packs are described in U.S. Pat. No. 5,344,297 to Hills, U.S. Pat. No. 5,466,410 to Hills, U.S. Pat. No. 5,853,635 to Morell et al. and U.S. Pat. No. 5.989,004 to Cook; the entire contents of each of the aforesaid references are incorporated herein by reference. Conventional spin packs can be modified to deliver the respective polymer streams to the desired outlet openings within the spin plate or spinneret. In addition, distinct first and second regions can be achieved by merging separate spunbond fiber streams, prior to web laydown, to create a single coflowing filament stream upon exit from the fiber draw unit. By merging the filaments prior to web laydown, the resulting composite web can have an area where the first and second filaments become mixed, i.e. where the first and second regions partially overlap. Thus, the first and second regions become and/or can be bonded such that the interface between the first and second regions is substantially similar to the appearance and/or structure of that of the first and/or second regions. This allows formation of a unitary composite nonwoven web without the need to fixedly attach the two regions by external means such as would be required by simply seaming, stitch bonding, adhesively bonding two separate nonwoven webs together. In addition, after fiber laydown and formation of the web, the composite nonwoven web can be further acted upon and/or processed as desired. As an example, the entire web can be bonded to form a durable, integrated web. The unitary nonwoven web can be thermally point bonded and/or through-air bonded as desired in order to impart additional integrity thereto.

Figure 2:
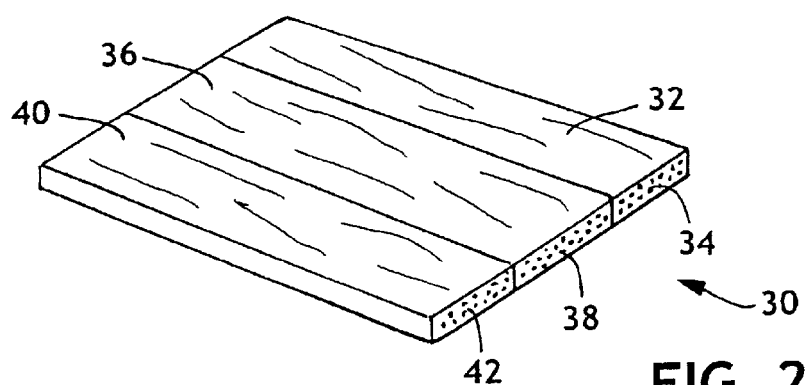
FIG. 2 is a partially broken-away view of a composite nonwoven web having a first region of first fibers, a second region of second fibers and a third region of third fibers.

In a further aspect, the unitary nonwoven web can have multiple regions of distinct filaments. In reference to FIG. 2, nonwoven web 30 can comprise first region 32 of first filaments 34, second region 36 of second filaments 38, and third region 40 of third filaments 42. First filaments 34 and second filaments 38 comprise different filaments and third filaments 42 and second filaments 38 comprise different filaments. First filaments 34 and third filaments 42 can either be the same or different from one another. Thus, it is possible to provide a nonwoven web of continuous filaments having discrete regions with disparate physical and/or functional characteristics within the MD of a unitary nonwoven web as desired. In one embodiment, the first and third regions can comprise substantially similar or identical filaments. Desirably the first, second and/or third regions each comprise at least about 2% of the total area of the composite nonwoven web and more desirably comprise between about 90% and about 5% of the total area of the nonwoven web. In this regard, often the polymer having the improved physical characteristics comprises a more expensive polymer. Thus, in such instances the size and/or frequency of the region utilizing the expensive component can be tailored so as to achieve the desired web properties while comprising a minimal area of the web. In addition, the individual regions can alternate such that the composite nonwoven web comprises multiple series of distinct regions.

Figure 3:
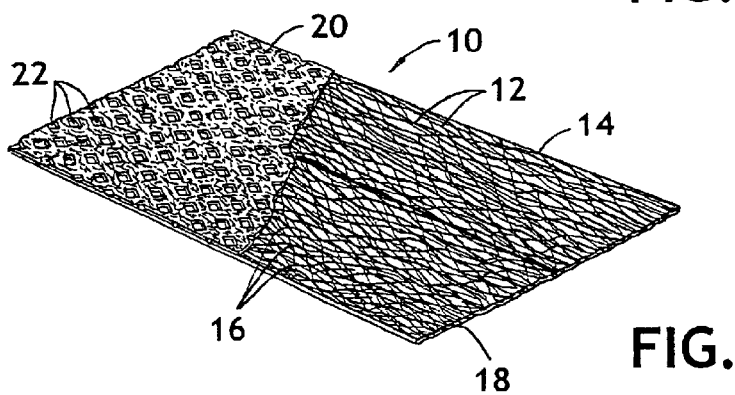
FIG. 3 is a partially broken-away view of a multilayer nonwoven laminate incorporating a composite nonwoven web having a first region of first fibers and a second region of second fibers.

The composite nonwoven webs of the present invention can be used alone or in combination with other layers or materials. In this regard, it may often be desirable to incorporate the nonwoven webs of the present invention within a multilayer laminate structure. As used herein "multilayer laminate" simply refers to a multilayer structure wherein two or more layers are fixedly attached to one another in a face-to-face relationship. One or more nonwoven webs of the present invention can be laminated to one or more additional layers or materials such as, for example, films, knitted or woven fabrics, foams, scrims, nonwoven fabrics, cellulosic materials and so forth. The multiple layers can be fixedly attached by one or means known in the art such as ultrasonically, thermally or adhesively attaching the layers. In a particular aspect the respective layers can each comprise thermoplastic polymers and can be thermally point bonded to form an integrated multilayer laminate. In one embodiment, a nonwoven web of the present invention can be bonded to one or more additional nonwoven fabrics to form a multi-layer nonwoven laminate. As a particular example and in reference to FIG. 3, homogeneous nonwoven web 20 is bonded to composite nonwoven web 10 which comprises first region 14 of first continuous filaments 12 and second region of second continuous filaments 16. The homogeneous nonwoven web 20 and the composite nonwoven web 10 can be bonded at discrete points 22 by thermal point bonding. Exemplary multilayer nonwoven laminates include, by way of example only, those wherein the outer layers comprise a spunbond web and the interior layer comprises a meltblown web; e.g. a spunbond/meltblown/spunbond (SMS) laminate. Exemplary multilayer laminates and methods of making the same are disclosed in U.S. Pat. No. 4,041,203 to Brock et al., U.S. Pat. No. 5,188,885 to Timmons et al., and U.S. Pat. No. 5,695,868 to McCormack. Multilayer laminates can be made by sequentially depositing onto a moving forming belt a first fabric layer, then a second layer and then bonding the laminate such as by thermal point bonding as described herein. Alternatively, the individual fabric layers may be made individually, collected in rolls, and combined in a separate bonding step.

The composite nonwoven fabrics of the present invention, and laminates thereof, can be utilized for or as a component in garments such as industrial workwear, undergarments, pants, shirts, jackets, gloves, socks, etc. as well as in infection control products such as surgical gowns and drapes, face masks, head coverings, shoe coverings, wound dressings, bandages, sterilization wraps, wipers, patient bedding and so forth. Still further, composite nonwoven fabrics of the present invention, and laminates thereof, can be utilized in one or more aspects as a component of a personal care product, e.g. personal hygiene oriented items such as diapers, training pants, absorbent underpants, adult incontinence products, feminine hygiene products, and the like. As specific non-limiting examples thereof, the composite nonwoven webs and/or laminates thereof can be used in conjunction with or in a manner as described in the following references: U.S. Pat. No. 4,965,122 to Morman et al.; U.S. Pat. No. 5,336,545 to Morman et al.; U.S. Pat. No. 4,720,415 to Vander Wielen et al.; U.S. Pat. No. 5,540,976 to Shawver et al.; U.S. Pat. No. 3,949,128 to Ostermeier; U.S. Pat. No. 5,620,779 to Levy et al.; U.S. Pat. No. 5,714,107 to Levy et al., U.S. Pat. No. 5,188,885 to Timmons et al., U.S. Pat. No. 5,759,926 to Pike et al.; U.S. Pat. No. 5,721,180 to Pike et al.; U.S. Pat. No. 5,817,584 to Singer et al.; U.S. Pat. No. 5,639,541 and U.S. Pat. No. 5,811,178 to Adam et al.; U.S. Pat. No. 5,385,775 to Wright et al; U.S. Pat. No. 4,853,281 to Win et al.; U.S. Pat. No. 4,833,003 to Win et al.; U.S. Pat. No. 5,486,166 to Bishop et al.; and U.S. Pat. No. 5,562,650 Everett et al. The aforesaid list of applications of the composite nonwoven webs and laminates thereof is not exhaustive and there exist numerous additional uses for the fabrics of the present invention.

Figure 4:
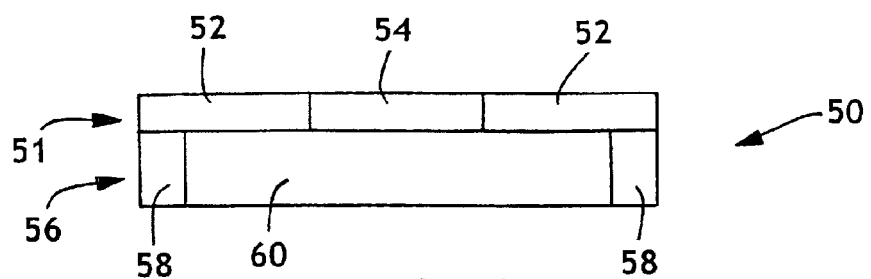
FIG. 4 is a cross-sectional view of a multilayer laminate comprising two composite nonwoven webs of the present invention.

Further, multiple layers of nonwoven webs of the present invention can themselves be bonded together to form multilayer laminates. As an example and in reference to FIG. 4, first composite nonwoven web 51 is bonded to second composite nonwoven web 56 thereby forming laminate 50. First composite nonwoven web 51 can comprise first regions 52 of first fibers and second region 54 of second fibers. Second composite nonwoven web 56 can comprise first regions 58 of first fibers and second region 60 of second fibers. The corresponding fibers in the first and second regions of the first and second composite nonwoven webs can be the same and/or different from those in the other layer.

While numerous ranges have been provided herein, it is intended that each and every sub-range between the express ranges provided likewise be included within the teachings of the present invention. As an example, a stated range of between 1 and 5 would therefore be understood to also include all sub-ranges, namely 1–4, 1–3, 1–2, 2–5, 2–4, 2–3 and so forth. In addition, while various patents and other reference materials have been incorporated herein by reference, to the extent there is any inconsistency between incorporated material and that of the written specification, the written specification shall control.

In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

We claim:

1. A composite nonwoven web comprising:
   a nonwoven web having a machine-direction and a cross-direction and comprising a first segment and a second segment wherein said first segment and second segment extend adjacent one another in said machine direction wherein said first segment and said second segment abut one another;
   said first segment comprising first continuous filaments and wherein said first continuous filaments comprise an elastomer;
   said second segment comprising second continuous filaments and wherein the second continuous filaments differ from the first continuous filaments in elasticity; and
   wherein said first continuous filaments proximate said second segment and said second continuous filaments proximate said first segment are in a confluent relationship with one another and form a unitary nonwoven web.

2. The composite nonwoven web of claim 1 wherein said second continuous filaments comprise an inelastic polymer.

3. The composite nonwoven web of claim 2 wherein the area of said first segment comprises between about 75% and about 25% of the total area of the composite nonwoven web.

4. The composite nonwoven web of claim 2 wherein said second continuous filaments comprise an olefin polymer.

5. The composite nonwoven web of claim 4 wherein said first continuous filaments comprise an elastic olefin polymer.

6. The composite nonwoven web of claim 4 wherein said first continuous filaments comprise an elastomer selected from the group consisting of polyesters, polyurethanes, polystyrenes and polyolefins.

7. The composite nonwoven web of claim 4 wherein said first continuous filaments comprise a blend of a polyolefin and a block copolymer having a styrenic moiety blocks and elastomeric polymer mid-blocks.

8. The composite nonwoven web of claim 1 wherein said nonwoven web is selected from the group consisting of spunbond and meltblown fiber webs.

9. The composite nonwoven web of claim 8 further comprising a third region adjacent said first region, said third region comprises third continuous filaments the same as the second continuous filaments and wherein said first continuous filaments proximate said third region and said third continuous filaments proximate said first region are in a confluent relationship with one another and form a unitary composite nonwoven web.

10. The composite nonwoven web of claim 9 wherein said first continuous filaments comprise a first olefin polymer and said second and third continuous filaments comprise a second olefin polymer and wherein said first olefin polymer has a higher modulus of elasticity than said second olefin polymer.

11. A composite nonwoven web comprising:
a nonwoven web having a machine-direction and a cross-direction and comprising a first segment and a second segment wherein said first and second segments extend adjacent one another in said machine direction;
said first segments comprising first continuous filaments and wherein said first continuous filaments are hydrophobic;
said second segments comprising second continuous filaments and wherein the second continuous filaments are hydrophilic; and
wherein said first continuous filaments proximate said second region and said second continuous filaments proximate said first region are in a confluent relationship with one another and form a unitary nonwoven web.

12. The composite nonwoven web of claim 11 wherein said second continuous filaments contain a wetting agent.

13. The composite nonwoven web of claim 12 further comprising a third region and wherein said third region is adjacent said second region, said third region comprises third continuous hydrophobic filaments and wherein said second continuous filaments proximate said third region and said third continuous filaments proximate said second region are in a confluent relationship with one another and form a unitary composite nonwoven web.

14. The composite nonwoven web of claim 13 wherein said second continuous filaments comprise a propylene polymer and an ethoxylated compound and further wherein said first and third continuous filaments consist essentially of a propylene polymer.

15. The composite nonwoven web of claim 11 wherein the second region is more porous than said first region.

16. The composite nonwoven web of claim 1 wherein the first continuous filaments comprise a first polymer composition and the second continuous filaments comprise a second polymer composition that is a different polymer composition from the first polymer composition.

17. The composite nonwoven web of claim 1 wherein the first segment and the second segment are coplanar.

18. A composite nonwoven web comprising:
a nonwoven web having a machine-direction and a cross-direction and comprising a first segment and a second segment wherein said first segment and second segment extend adjacent one another and abut one another;
said first segment comprising first continuous filaments;
said second segment comprising second continuous filaments wherein the second continuous filaments differ from the first continuous filaments in cross-sectional shape, cross-sectional configuration, crimp level, hydrophobicity, addition or level of internal treatments or additives, tensile strength or elasticity; and
wherein said first continuous filaments proximate said second segment and said second continuous filaments proximate said first segment are in a confluent relationship with one another and form a unitary nonwoven web.

19. The composite nonwoven web of claim 18 wherein filaments are not exposed to a heat source to shrink the filaments.

20. The composite nonwoven web of claim 18 wherein the first segment and the second segment are coplanar.

21. The composite nonwoven web of claim 18 wherein the second continuous filaments differ from the first continuous filaments in cross-sectional shape.

22. The composite nonwoven web of claim 18 wherein the second continuous filaments differ from the first continuous filaments in cross-sectional configuration.

23. The composite nonwoven web of claim 18 wherein the second continuous filaments differ from the first continuous filaments in crimp level.

24. The composite nonwoven web of claim 18 wherein the second continuous filaments differ from the first continuous filaments in hydrophobicity.

25. The composite nonwoven web of claim 18 wherein the second continuous filaments differ from the first continuous filaments in addition or level of internal treatments or additives.

26. The composite nonwoven web of claim 18 wherein the second continuous filaments differ from the first continuous filaments in tensile strength.

27. The composite nonwoven web of claim 18 wherein the second continuous filaments differ from the first continuous filaments in elasticity.

* * * * *